United States Patent [19]
Amorese et al.

[11] Patent Number: 5,556,113
[45] Date of Patent: Sep. 17, 1996

[54] O-RING ENVELOPE GASKET

[75] Inventors: Franklyn J. Amorese, Hilton; Anthony S. Bellavia, Spencerport, both of N.Y.

[73] Assignee: Pfaudler, Inc., Rochester, N.Y.

[21] Appl. No.: 308,157

[22] Filed: Sep. 19, 1994

Related U.S. Application Data

[63] Continuation-in-part of Ser. No. 43,462, Apr. 2, 1993, abandoned.

[51] Int. Cl.⁶ .................................................. F16J 15/10
[52] U.S. Cl. .................................... 277/233; 277/235 B
[58] Field of Search .................................. 277/229, 233, 277/235 A, 235 B

[56] References Cited

U.S. PATENT DOCUMENTS

| | | | |
|---|---|---|---|
| 2,395,243 | 2/1946 | Aukers | 277/235 B |
| 3,595,589 | 7/1971 | Henderson | 277/235 B |
| 3,606,361 | 9/1971 | Pohl et al. | 277/235 B |
| 4,026,565 | 5/1977 | Jelinek | 277/235 B |
| 4,560,718 | 12/1985 | Ritchey | 277/235 B |
| 4,691,928 | 9/1987 | Abele | 277/235 B |
| 4,795,174 | 1/1989 | Whitlow | 277/235 B |
| 4,834,279 | 5/1989 | McDowell et al. | 277/235 B |
| 4,836,158 | 6/1989 | Panzica | 277/235 B |
| 4,915,355 | 4/1990 | Fort | 277/229 |
| 5,076,592 | 12/1991 | Pearlstein | 277/235 B |
| 5,195,759 | 3/1993 | Nicholson | 277/229 |
| 5,275,139 | 1/1994 | Rosenquist | 277/235 B |
| 5,277,433 | 1/1994 | Ishikawa et al. | 277/235 B |
| 5,362,074 | 11/1994 | Gallo et al. | 277/235 B |

FOREIGN PATENT DOCUMENTS

| | | |
|---|---|---|
| 2308288 | 11/1976 | France . |
| 949657 | 2/1964 | United Kingdom . |
| 1168184 | 10/1969 | United Kingdom . |
| WO92/09428 | 6/1992 | WIPO . |

OTHER PUBLICATIONS

"Pfaudler—U.S.,Inc., Sales Literature for DS40–100–2 Gaskets, copyright 1989".

Primary Examiner—William A. Cuchlinski, Jr.
Assistant Examiner—John L. Beres
Attorney, Agent, or Firm—Michael L. Dunn

[57] ABSTRACT

A gasket for sealing two flange faces against each other comprising at least two compressible layers, a reinforcing metal ring sandwiched between the compressible layers, said compressible layers and metal ring having a combined thickness and an inner and an outer edge, a resilient O-ring located at the inner edge of the combined compressible layers and metal ring, said O-ring having an inner edge and having a diameter greater than said combined thickness, and a fluoropolymer sheet enveloping the O-ring and combined compressible layers and metal ring to form the gasket such that when the gasket is installed the fluoropolymer sheet contacts both flange faces and covers the inner edge of the O-ring. The gasket is particularly suitable for sealing the surfaces of glass coated flanges where the contents of materials within the flanges are under pressure.

10 Claims, 2 Drawing Sheets

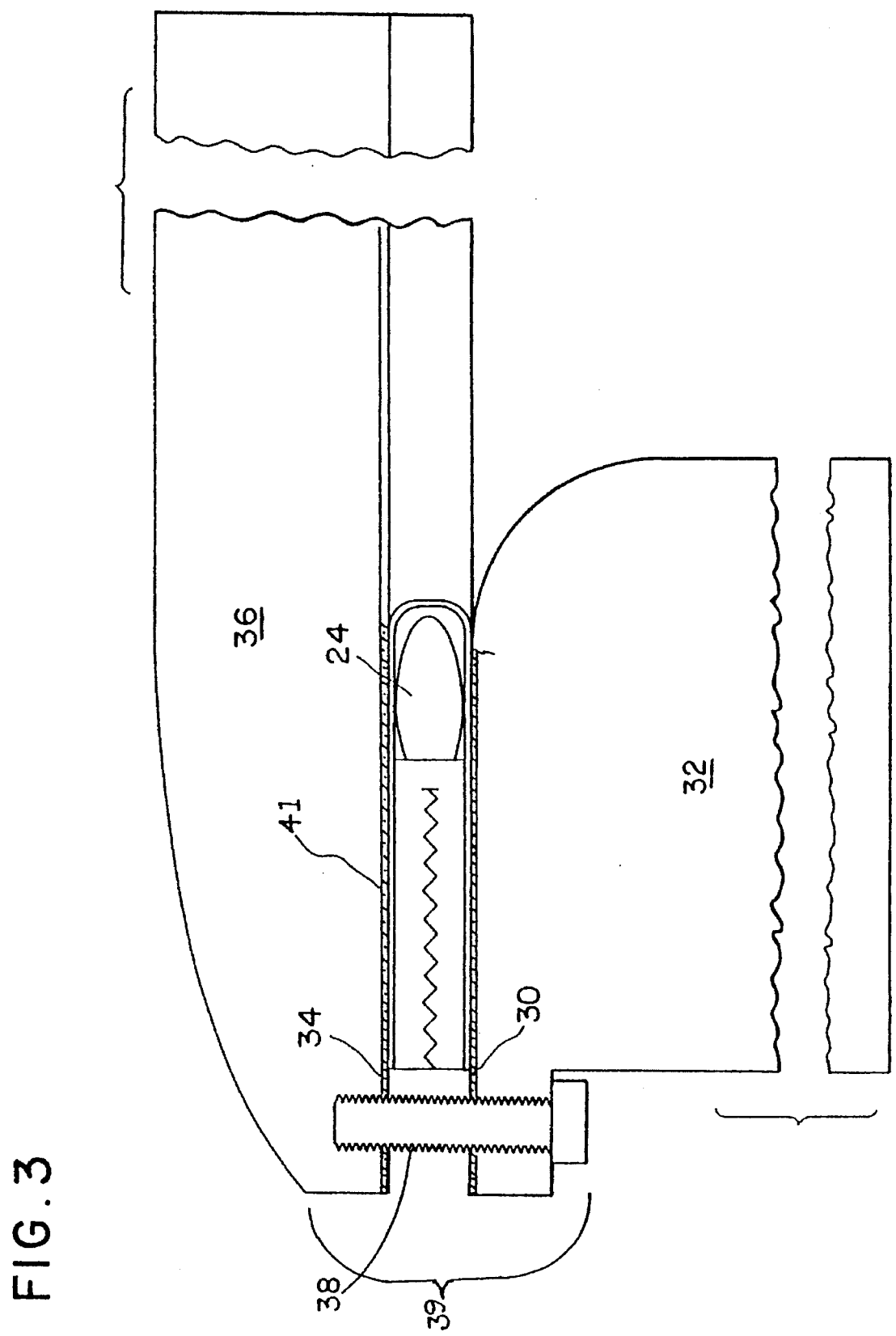

5,556,113

O-RING ENVELOPE GASKET

This is a Continuation-in-Part of U.S. Ser. No. 08/043,462, filed Apr. 2, 1993, now abandoned.

BACKGROUND OF THE INVENTION

This invention relates to seals for flange faces and more particularly relates to sealing gaskets for such flange faces.

Gaskets for sealing flange faces together are well known in the art. Unfortunately readily removable and cost effective gaskets for sealing flange faces have not been as good as desired, especially when the flange faces have been glass coated and surround openings in vessels or conduits having corrosive contents which are under pressure, e.g. 300 psi or higher. Under such conditions seals between flange faces have often been known to leak or even blow out. Further such known gaskets require high seating loads which can cause glass lining failures. Such seals also require a large number of clamps or bolts around the seal area in order to maintain the high loads required. In addition such seals have required the use of flange thicknesses which are greater than desired because thick flanges have been necessary to withstand the high loads.

Known seals for glass and other smooth surfaces generally use gaskets having flat surfaces which can seal at almost any location on the surface. Such seals are not as sanitary as desirable for pharmaceutical and food applications due to cracks at the edge of the contact areas between the sealing flange and gasket which may harbor contamination because the actual seal may be formed at another location on the flat gasket surface.

It has been known to use O-rings to form seals between flange faces; however, grooves have been placed in the flange faces in order to position and retain the O-rings, especially when any significant pressure is involved. Such grooves still do not retain the O-rings as well as desired and such grooves cannot be practically placed in a glass coated flange surface.

It is therefore an object of the present invention to provide an improved gasket for flange faces to overcome disadvantages of gaskets for flange faces known to those skilled in the art.

BRIEF DESCRIPTION OF THE DRAWINGS

FIG. 3 shows a cross sectional view of a gasket in accordance with the present invention in compression and sealing two flange faces.

BRIEF DESCRIPTION OF THE INVENTION

Figure 1:
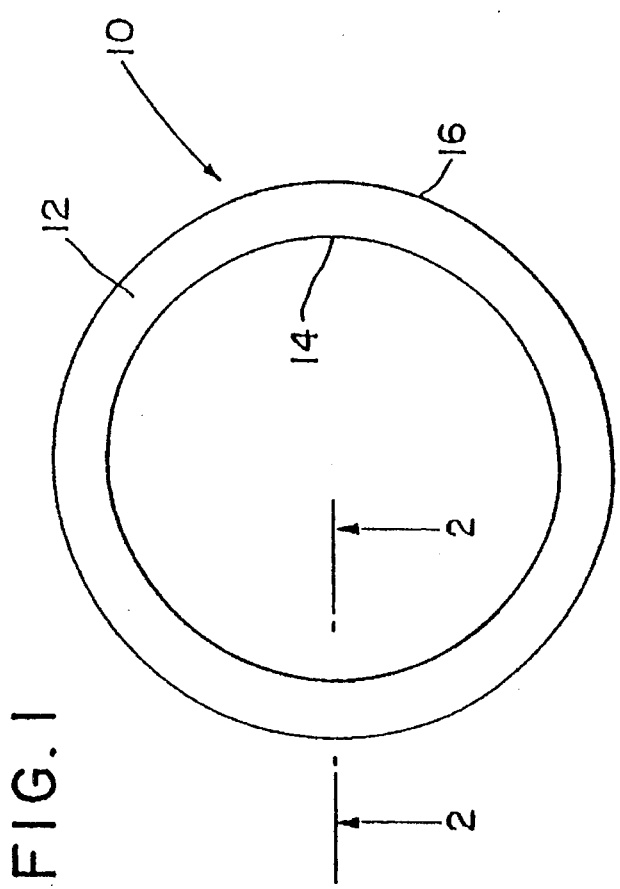
FIG. 1 shows a top view of a gasket in accordance with the present invention.

In accordance with the present invention there is provided a gasket for sealing two flange faces against each other comprising at least two compressible layers, a reinforcing metal ring sandwiched between the compressible layers, the compressible layers and metal ring having a combined thickness and an inner and an outer edge, a resilient O-ring separate and detached from the compressible layers and metal ring located proximate the inner edge of the combined compressible layers and metal ring, the O-ring having an inner edge and having a diameter greater than the combined thickness, and a fluoropolymer sheet enveloping the O-ring and combined compressible layers and metal ring to form the gasket such that when the gasket is installed the fluoropolymer sheet contacts both flange faces and covers the inner edge of the O-ring.

DETAILED DESCRIPTION OF THE INVENTION

The flange faces which may be sealed together with the gasket in accordance with the present invention may be essentially any flange faces but the gasket of the invention is particularly suitable for flanges which are lined with corrosion resistant material, especially glass or ceramic. It is to be understood, however that the flanges need not be coated and may be stainless steel, and other corrosion resistant alloys such as alloys of chromium or nickel, e.g. Inconel and Monel. The material of construction of the flanges may also be unalloyed corrosion resistant material such as nickel and even rare earth metals such as platinum or palladium. The flanges need not even be corrosion resistant and may for example be mild steel or even cast iron if the material can otherwise withstand the conditions imposed upon the flange.

The flanges to be sealed may be on essentially any container or conduit such as reaction vessels, storage vessels, and flanged pipes.

The gasket of the present invention comprises at least two compressible layers having a reinforcing metal ring sandwiched between them. The material of construction of the compressible layers may be any material having sufficient strength and compressibility to form a seal and remain in position without failing due to forces, e.g. pressure, applied from within the vessel. Suitable compressible materials usually comprise high strength fibers alone or embedded within another matrix forming material. Examples of such fibers are polyamides, especially aromatic polyamides such as Kevlar® which has very high tensile strength and greater resistance to elongation than steel.

The matrix forming material in which the fibers may be embedded is usually a plastic material having a compressible nature and desirably an elastomeric nature. Examples of such materials are polytetrafluoroethylene and polyamides. Traditional elastomers such as polyurethanes, butadiene polymers, styrene-butadiene polymers (NBR) and acrylonitrile-styrene-butadiene polymers (ABS) may also be used; provided that, their strength and heat resistance are high enough for the application. Examples of particularly suitable elastomers are fluorinated butyl rubbers, fluorinated butadiene rubbers, fluorinated NBR's and fluorinated ABS's. One particular suitable fluorinated elastomer is Viton® manufactured by E. I. duPont.

The gasket further comprises a resilient O-ring located at the inner edge of the combined compressible layers and metal ring. "Inner edge" as used herein, means the edge closest to the interior of the vessel or conduit to which the flange is applied and also may be considered the edge having the smallest circumference. By contrast, the "outer edge" is the edge furthest from the interior of the vessel or conduit and is the edge having the largest circumference. The O-ring is manufactured from an elastomer and is larger in diameter than the combined thickness of the compressible layers and metal ring. Suitable elastomers are fluorinated elastomers as above described.

The reinforcing metal ring is usually a steel ring which may optionally be corrugated for better holding power in the compressible material. The thickness of the metal may vary but is usually from about one-sixteenth to about one-eighth inch in thickness. The steel is usually, but not essentially, stainless steel. The metal ring strength requirements vary depending upon the size of the gasket and pressure forces. Such strength requirements can be readily calculated by one skilled in the art.

The compressible material and metal ring may be further bonded together, if desired, by a suitable adhesive or by heat sealing.

The assembled gasket is held together and in essential respects covered by a fluoropolymer sheet such that the O-ring is held against the inner edge of the compressible layers and metal ring. The sheet covers the lower surface of the compressible layers, is folded over the O-ring and covers the upper surface of the compressible layers. The outer edge of the compressible layers may or may not be covered by the fluoropolymer sheet. The fluoropolymer sheet is bonded to the upper and lower surfaces of the compressible sheet by means of heat sealing or adhesive. In either case, if desired to obtain a better bond, the inside surface of the fluoropolymer sheet may be pretreated either chemically, e.g. by partial oxidation or by other means, e.g. corona discharge. The fluoropolymer sheet is usually polytetrafluoroethylene (PTFE). The thickness of the sheet is selected so that it does not restrict the movement of the elastomeric O-ring especially at low pressure and vacuum, yet is thick enough to support the forces from pressure and vacuum in conjunction with the other components of the gasket.

It is to be understood that the O-ring is separate and detached from the compressible layers and the metal ring.

The gasket is installed between the surfaces of two flange faces to be sealed and the flange faces are tightened together to squeeze the seal between them. Any suitable means for tightening the flanges together may be used, e.g., bolts or clamps.

The invention may be better understood by reference to the drawings which illustrate a preferred embodiment of the invention.

FIG. 1 shows a top view of a gasket 10 according to the present invention showing a top surface 12, an inner edge 14 and an outer edge 16. As can be seen from FIG. 1, the gasket is in the form of a circular ring; however, the gasket may be in other closed shapes such as ellipses, etc. A circular shape is, however, preferred due to uniform distribution of stress when pressure is applied upon inner edge 14 by contents of a vessel or conduit to which it is applied.

Figure 2:
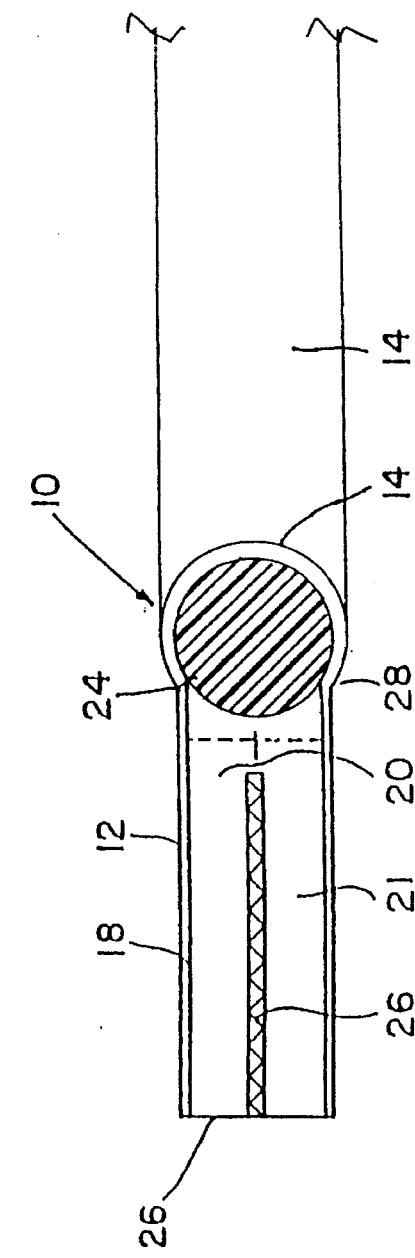
FIG. 2 shows a magnified cross sectional view of the gasket of FIG. 1 taken on lines 2—2 of FIG. 1.

FIG. 2 shows a magnified cross sectional view taken on line 2—2 of FIG. 1. In FIG. 2 gasket 10 is shown as having a fluoropolymer sheet 18 encompassing compressible layers 21 and 22 and O-ring 24, with the exception of outer edge 16. Metal strip 26 can be seen embedded between compressible layers 21 and 22. FIG. 2 also clearly shows lower surface 28 of the gasket and fluoropolymer sheet.

FIG. 3 shows the gasket of FIG. 2 installed between a flange face 30 of a vessel wall 32 and the flange face 34 of a vessel cover 36. As can be seen in FIG. 3, the flange faces 30 and 34 coated with glass layers 41 are drawn together and held together by means of a bolt 38. Flange faces 30 and 34 and bolt 38 together act as clamp 39. In reality the flange faces are held by a plurality of such bolts about the flanges. As can be seen in FIG. 3, the O-ring 24 is in compression and is deformed to assist in forming a primary seal by causing resilient contact of upper surface 12 with flange face 34 and lower surface 28 with flange face 34. This primary seal makes the structure especially suitable for use in the pharmaceutical and food industries since a seal always occurs at the fluoropolymer sheet in the area of the O-ring regardless of whether or not secondary seals also occur along the fluoropolymer sheet in the area of the compressible layers.

There are many advantages to the gasket of the present invention and the seal formed using it. In particular the gasket permits sealing against high pressure, e.g. 350 psi or higher, upon a smooth flange face such as a glass coated or polished flange face. Further since the gasket comprises an elastomer it will conform to the flange faces to fill any voids or unevenness in the faces. Further, since the gasket, in large part comprises plastic materials, it can be used upon glass or ceramic coated flange faces without damaging them. Additionally, less bolt torque is required to seal the gasket of the invention compared to gaskets in the prior art used in similar conditions, lower torque prevents damage to the flange faces and permits the use of flanges which are thinner than conventional and permits the use of fewer clamps or bolts.

Since the entire gasket, with the optional exception of the outside edge, is encompassed by a fluoropolymer sheet, the chemical and heat resistance of the exterior of the gasket conforms to the very good heat and chemical resistance of such sheet. Further since the gasket is contiguous around the flange faces and is preferably circular in shape, pressure applied to the gasket from within a vessel or conduit forces the gasket into radial tension. Since the gasket comprises very strong fibers and a metal ring, the tension is held by the fibers and metal ring thus reducing the likelihood of failure under pressure. The O-ring is in fact forced against the metal ring by internal pressure and is thus retained against such pressure. Furthermore, even under vacuum the O-ring is retained since the fluoropolymer sheet restrains inward movement of the O-ring.

What is claimed is:

1. A gasket for sealing two flange faces against each other comprising at least two compressible layers, a reinforcing metal ring sandwiched between the compressible layers, said compressible layers and metal ring having a combined thickness and an inner and an outer edge, a resilient O-ring separate and detached from said compressible layers and metal ring located proximate the inner edge of the combined compressible layers and metal ring, said O-ring having an inner edge and having a diameter greater than said combined thickness, and a fluoropolymer sheet enveloping the O-ring and combined compressible layers and metal ring to form the gasket such that when the gasket is installed the fluoropolymer sheet contacts both flange faces and covers the inner edge of the O-ring and the O-ring is compressed to a thickness equal to the combined thickness.

2. The gasket of claim 1 wherein it is in a sealing position between two flange faces.

3. The gasket of claim 2 wherein a first of said flanges is a flange at an opening in a vessel and a second of said flanges is a flange on a cover for said opening and said inner edge of said O-ring and said inner edge of said combined compressible layers and metal ring both face toward the vessel opening.

4. The gasket of claim 2 wherein flanges are flanges about sections of conduit having a conducting opening therethrough and said inner edge of said O-ring and said inner edge of said combined compressible layers and metal ring both face toward the conducting opening.

5. The gasket of claim 2 wherein the two flange faces are forced together by means of bolts with the gasket in sealing relationship therebetween.

6. The gasket of claim 2 wherein the two flange faces are forced toward each other by means of clamps with the gasket in sealing relationship therebetween.

7. The gasket of claim 1 wherein the fluoropolymer sheet is polytetrafluoroethylene.

8. The gasket of claim 1 wherein the compressible layers comprise aromatic polyamide.

9. The gasket of claim 1 wherein the metal ring comprises stainless steel having a thickness of from one-sixteenth to one-eighth inch.

10. The gasket of claim 2 wherein the surfaces of the flanges are glass coated.

* * * * *